(12) United States Patent
Song et al.

(10) Patent No.: US 7,608,338 B2
(45) Date of Patent: Oct. 27, 2009

(54) HIGH BRIGHTNESS COATING COMPOSITIONS AND RELATED PRODUCTS

(75) Inventors: Jay Cheng Song, Highland Mills, NY (US); Sen Yang, Nanuet, NY (US)

(73) Assignee: International Paper Company, Memphis, TN (US)

( * ) Notice: Subject to any disclaimer, the term of this patent is extended or adjusted under 35 U.S.C. 154(b) by 1194 days.

(21) Appl. No.: 10/461,815

(22) Filed: Jun. 12, 2003

(65) Prior Publication Data

US 2004/0038056 A1 Feb. 26, 2004

Related U.S. Application Data

(60) Provisional application No. 60/388,794, filed on Jun. 13, 2002.

(51) Int. Cl.
  B32B 5/16 (2006.01)
  B32B 27/00 (2006.01)
  B41M 5/00 (2006.01)
  C08J 7/04 (2006.01)

(52) U.S. Cl. .................. 428/500; 428/32.25; 428/32.31; 428/32.34; 428/32.38; 428/323; 428/325; 428/327; 428/328; 428/329; 428/330; 428/331; 428/341; 428/537.5

(58) Field of Classification Search .............. 428/32.25, 428/32.31, 32.34, 32.38, 323, 325, 327–331, 428/341, 500, 537.5
See application file for complete search history.

(56) References Cited

U.S. PATENT DOCUMENTS

| 4,198,471 A | 4/1980 | Nelson |
| 4,301,210 A | 11/1981 | Yasuda et al. |
| 4,317,849 A | 3/1982 | Ogura et al. |
| 4,778,711 A | 10/1988 | Hosomura et al. |
| 5,254,403 A | 10/1993 | Malhotra |
| 5,360,657 A | 11/1994 | Kano et al. |
| 5,690,728 A | 11/1997 | Ravishankar |
| 5,846,637 A | 12/1998 | Malhotra et al. |
| 5,952,082 A | 9/1999 | Normington et al. |
| 5,965,315 A | 10/1999 | Fujii et al. |
| 5,989,701 A | 11/1999 | Goetzen et al. |
| 2002/0008857 A1 | 1/2002 | Kosugi et al. |
| 2004/0038056 A1 | 2/2004 | Song et al. |

FOREIGN PATENT DOCUMENTS

| CH | 523785 | 12/1969 |
| EP | 0972651 A | 1/2000 |
| EP | 1045068 A2 | 10/2000 |
| FR | 1510289 | 1/1967 |
| GB | 1391593 | 4/1975 |
| JP | 6-231595 | 8/1994 |
| JP | 6231595 | 8/1994 |
| WO | WO95/11342 | 4/1995 |
| WO | WO 00/40424 | 7/2000 |
| WO | WO01/55793 | 8/2001 |

*Primary Examiner*—Sheeba Ahmed
(74) *Attorney, Agent, or Firm*—Thomas W. Barnes, III; Richard C. Stewart, II; Dara L. Onofrio

(57) ABSTRACT

The invention provides a coating composition that provides high brightness, high gloss and superior print quality. The coated product comprises a substrate coated on at least one side with a coating composition comprising a pigment component and a binder component that is made of mixture of two binder resins. Both binder resins are capable of film forming. The first binder resin provides coating gloss and adhesion properties and the second binder resin enhances coating porosity, adhesion, and anti-static properties. The first binder resin that is used at 60-95% by weight of the total binder resin blend is selected from the group consisting of vinyl acetate acrylate, styrene acrylate and styrene butadiene acrylic copolymers. The second binder resin that is used at 5-40% by weight of the total binder resin blend is selected from the group consisting of anion type polystyrene derivatives, polyethylene glycol and polypropylene glycol.

23 Claims, No Drawings

HIGH BRIGHTNESS COATING COMPOSITIONS AND RELATED PRODUCTS

This application claims the benefit of U.S. Provisional Application Ser. No. 60/388,794 filed on Jun. 13, 2002, which is incorporated herein by reference.

FIELD OF THE INVENTION

The present invention relates to high brightness coating compositions and related products that give high brightness, high blister and superior print quality. More particularly, the invention relates to a coating composition comprising a mixture of two film forming binder resins and a pigment component that are coated on a paper substrate.

BACKGROUND OF THE INVENTION

WO 00/40424 published on Jul. 13, 2000 discloses a multi-layer coated copy paper which has a thermal insulating layer, between the base paper layer and the outer topcoat layer. The thermal insulating layer contains from 10% to 70% calcium carbonate, from 90% to 30% fully or partially calcined clay and from 0% to 30% satin white with a binder.

U.S. Pat. No. 4,301,210 to Yasuda et al. discloses a high quality cast coated paper with an aqueous undercoat layer and an aqueous overcoat layer. The undercoat layer was applied using a blade coating. The overcoat layer was applied using a cast coating method. The overcoat layer contains a polymer latex with a glass transition temperature of 38 degrees Celcius or higher. The overcoat was dried at a temperature below the glass transition temperature of the polymer latex. A glossy finish was obtained by subjecting the overcoat surface to mirror finish treatment at a temperature higher than the glass transition temperature of the polymer latex.

U.S. Pat. No. 4,317,849 to Ogura et al. discloses a high-gloss coated paper with an aqueous coating comprising a synthetic polymer latex (A) having a glass transition temperature of at least 38 degree Celcius and a synthetic polymer latex (B) having a glass transition temperature of 5 to 25 degree Celcius. The weight ratio of A to B is from 1/0.1 to 1/1. The coated surface was subjected to hot roll calendering at temperatures higher than the glass transition temperature of polymer latex A.

U.S. Pat. No. 5,360,657 to Kano et al. discloses a process to produce coated printing paper by first applying a pigment coating layer and applying a thermal plastic latex with a second order transition temperature of at least 80 degrees Celcius and an average particle size of smaller than 100 nm. High gloss is obtained by adding lubricants to the surface layer and calendering at 10 to 30 degrees Celcius.

EP 1 045 068 A2 published on Oct. 18, 2000 discloses a coated paper product having high gloss and brightness. The paper substrate is coated on at least one side with an aqueous coating formulation comprising an effective amount (14-35% by weight) of a plastic pigment and finished in a supercalender device.

U.S. Pat. No. 5,965,315 to Fuji et al. discloses a transfer sheet for electrophotography which comprises a substrate coated with a porous resin-containing layer. The coated layer has a surface average pore diameter of 0.5 to 50 micrometer. The transfer sheet is said to be capable of eliminating mottles and dots and minimum gloss contrast between the blank portion and the image portion.

U.S. Pat. No. 5,254,403 to Malhotra discloses a recording sheet which comprises a substrate and an image receiving layer comprising a mixture of (a) a polymer capable of forming a latex, (b) a polysaccharide; and (c) a polymer containing oxyalkylene monomers. The recording sheets are suitable to use in both inkjet and electrophotographic imaging processes.

U.S. Pat. No. 5,952,082 to Normington et al. discloses a coated paper particularly suitable for electrophotographic copying. The coated paper has a given basis weight with proportionally less coating and proportionally more fiber than conventional coated paper made for electrophotographic processes. The coated sheet is calendered to achieve a TAPPI 75 degree gloss value of about 45. The coated paper is said to have good fusing of dried toner on the paper at marginally lower temperatures. The typical properties are as follows: 45 gloss; 87 brightness, 91.5 opacity (for 70 # paper); and 2.1-2.3 Parker Print Smoothness.

U.S. Pat. No. 4,198,471 to Nelson discloses a coated printing paper using a pigment system comprising a combination of a thermoplastic polymer and a thermosetting polymer. The amount of thermoset is preferably at least about 25% by weight of the pigment solids to provide improved ink receptivity and paper gloss. The amount of the thermoset is preferable below 75% by weight of the pigment solids so that the finished printing paper has a Gardner 75 degree gloss of at least about 40, using a calendering pressure of less than 500 PLI.

U.S. Pat. No. 5,846,637 to Malhotra et al. discloses a coated xerographic photographic paper comprised of (1) a cellulosic substance; (2) a first antistatic coating layer in contact with one surface of the substrate: (3) a second toner receiving coating on top of the antistatic layer; and (4) a third traction controlling coating in contact with the back side of the substrate.

U.S. Pat. No. 4,778,711 to Hosomura et al. discloses a coated electrophotographic image transfer paper that reduces blistering during fixing. The coated electrophotographic image transfer paper has a center-line-average surface roughness of not more than 2.0 micrometer and air permeability of less than 4,000 seconds.

Although various designs of coated paper, in particular electrophotographic paper, have been disclosed in the prior art, none of the known designs overcomes the shortcomings of inadequate coating gloss, poor toner adhesion, low brightness, blistering, feeding jams and excessive static build-up. The objective of the present invention is to address these performance shortcomings of coated paper.

SUMMARY OF THE INVENTION

In accordance to the present invention, the coated product comprises a paper substrate coated on at least one side with a coating composition comprising a pigment component and a binder component made of a mixture of two binder resins. Both binder resins are capable of film forming. The first binder resin provides coating gloss and adhesion properties. The second binder resin enhances coating porosity, adhesion, and anti-static properties. The first binder resin which is used at 60-95% by weight of the total binder resin blend is selected from the group consisting of vinyl acetate acrylate, styrene acrylate and styrene butadiene acrylate copolymers. The second binder resin which is used at 5-40% by weight of the total binder resin blend is selected from the group consisting of anion type polystyrene derivatives, polyethylene glycol and polypropylene glycol.

The coated products of the invention provide high brightness, high gloss and superior print quality. The GE brightness of the finished coating is in the range of 93-99. The TAPPI 75 degree gloss is in the range of 70-90. Moreover, the coated electrophotographic paper of this invention exhibits high blister resistance. It also gives a superior print gloss and a higher print density than the existing commercial products.

Other objects, features and advantages of the present invention will be apparent when the detailed description of the preferred embodiments of the invention, are considered in an illustrative and not limiting sense.

DETAILED DESCRIPTION OF THE INVENTION

The invention provides in general a coating composition comprising a pigment component and a binder component. The binder component is preferably a mixture of at least two film forming binder resins.

The coating compositions are coated on at least one substrate surface to form coated products in accordance with the invention. The coating composition may be coated on both sides of the substrate or in multiple layers. In an alternate embodiment, a pre-coat or base coat is applied to the substrate surface that is then followed by application of the coating composition. The pre-coat or base coat and the coating composition may be the same composition or may differ. As described in the following examples, a preferred base coat comprises a pigment component and a starch binder. Typically, each of the coating layers on the substrate surface have a coating weight in the range of 8-20 gsm.

In a preferred application, a gloss coated paper for electrophotographic printing is provided with high brightness, high gloss and superior print quality. The selection of coating substrate is very important since the properties of the substrate can affect the performance of the coated substrate.

The substrate has one or more required property or properties that enhance the beneficial properties or advantages of the coated electrophotographic sheet. These properties are smoothness, internal bonds, brightness, stiffness, formation, and sizing. The smoothness of the base paper can affect the smoothness of the final coating. Generally speaking, a smoother base paper can lead to a smoother surface finish under the same amount of coating weight. So base papers with low smoothness are preferred to use as coating substrate. High Scott internal bond values are preferred since paper substrates with high Scott internal bond values are beneficial to the blister resistance of the coated paper. Since the brightness of the coated paper depend to a large extent on the brightness of the substrate paper, to achieve high brightness in the final product, the brightness of the base paper needs to be reasonably high. Using high brightness pigment and optical brightening agent, the brightness of the coated sheets can be significantly higher than the coating substrate. However, if very high brightness values are desired, the brightness of the base paper should be adequate.

The formation index of the base paper has to be greater than 70. Base papers with low values of formation index are not uniform in paper properties. A paper substrate with uneven porosity value across the sheet is more susceptible to blistering. In addition, the electrical properties of the base paper are critical for the control of static and electrostatic imaging transfer process.

Preferred substrates are paper substrates that meet the following requirements: The GE brightness value is in the range of 85%-96%. The basis weight value is in the range of 70 gsm to 250 gsm. The Gurley porosity value is in the range of 0 to 500 seconds. The moisture content is in the range of 2%-5%. The smoothness of the raw paper stock is very critical. The preferred range of surface smoothness is between 30-250 Sheffield unit. The Scott bond value is in the range of 90-500; The surface resistivity value is in the range of $1 \times 10^8$ to $1 \times 10^{12}$ ohms/square; The value of Kajaani formation index is in the range of 60 to 100.

Binder resins are selected to provide a resultant coating with high gloss, high brightness, high blister resistance, improved toner adhesion and superior image quality. Suitable binders are vinyl acetate acrylate copolymers, styrene acrylate latex, and styrene butadiene acrylate copolymers. Examples of vinyl acetate acrylate copolymers include Resyn 25-1155, and Resyn 25-1151 from National Starch, Sunbond polyvinyl acetate resin from Omnova Solution, Inc., H1R038 polyvinyl acetate from Specialty Polymers, Inc. Examples of styrene acrylates include Acronal resins from BASF, styrene acrylic copolymer emulsion resins from Dow Chemicals, and styrene acrylic resins from Specialty Polymers, Inc. Examples of styrene butadiene acrylic copolymers include styrene butadiene acrylonitrile copolymer from Dow Chemicals, Styronal resins from BASF, Gencryl and Genflo resins from Omnova Solutions, Inc.

The selection of binder resins is critical to the performance of the coated electrophotographic paper. First of all, the binder resins must possess good film forming ability to form a coherent coating and provide sufficient coating adhesion and toner adhesion. The binder resin must be able to provide a coating with sufficient porosity to prevent the coating from blistering under heat and pressure in the hot fuser. The glass transition temperature of the binder resin is an important parameter to consider in order to select a proper type of binder to use. The proper balance of the coating porosity and gloss rendering is critical to the development of a high performance coated electrophotographic paper. It was found in this invention that the coating porosity can be increased by blending two film forming resins as binder resins. The first binder resin provide coating gloss and adhesion properties. The second binder resin enhances coating porosity, adhesion, and antistatic properties. The first binder resin which is used at 60-95% by weight of the total binder resin blend is selected from the group consisting of vinyl acetate acrylate, styrene acrylate and styrene butadiene acrylic copolymers. The second binder resin which is used at 5-40% by weight of the total binder resin blend is selected from the group consisting of anion type polystyrene derivatives, polyethylene glycol and polypropylene glycol.

Illustrative of suitable pigments are fine powders of aluminum trihydrates with particle sizes in the range of 0.05-5 microns; Kaolin clay; calcium carbonates; satin white; silica, alumina silicates. Preferred pigments are fine powders of aluminum trihydrates with particle sizes in the range of 0.05-5 microns, Kaolin clay; and calcium carbonates. Optionally, plastic pigments can be used to enhance the coating gloss. Examples of plastic pigments include Ropaque 1055 from Rohm and Haas; HS 2000, HS 3000, DPP 710, DPP from Dow Chemicals.

More preferred pigments are fine powders of aluminum trihydrates with particle sizes in the range of 0.05-5 microns, Kaolin clay and ground and precipitated calcium carbonates.

The pigment may have one or more required property or properties that enhance the beneficial properties of coated EP sheets. These properties are high values of brightness, fine particle size, ease of dispersion, high porosity, and good rheological properties.

The amount of binder in the coating is generally from about 8% to about 25% by weight based on the total weight of the coating. The amount of binder in the coating is preferably from about 10% to about 22% by weight.

The amount of pigment in the coating is generally from about 50% to about 90% by weight based on the total weight of the coating. The amount of pigment in the coating is preferably from about 70% to about 85% by weight.

The present invention will be illustrated in more detail by the following examples without limiting the scope of the claimed compositions or method in any way. The following test methods were used in the Examples to measure the physical properties of the coated products unless specified otherwise.

GE Brightness was measured according to TAPPI Standard Procedure T452. The shininess of the coatings was measured by 75 degree gloss according to TAPPI Standard Procedure T480. Air Resistance was measured according to TAPPI Standard Procedure T460.

CIE L*, a*, and b* values are measurement of the color or shade of the paper (Tappi test method T524). They are important for paper aesthetics. L* represents lightness from zero for black to 100 for perfect white. a* represents redness of paper is the value is positive and greenness when the value is negative. b* represents yellowness of the paper if the value is positive and blueness if the value if negative.

EXAMPLES

Example 1

A coating composition was prepared according to formulation in Table Ia.

TABLE Ia

| Hydral Coat 2 aluminum trihydrate[1] | 82 parts |
|---|---|
| Capim DG pigment[2] | 13 parts |
| Ropaque HP-1055[3] | 5 parts |
| Vinyl acetate acrylic copolymer[4] | 19 parts |
| Sodium salt of sulfonated polystyrene[5] | 3 parts |
| Ethylated starch[6] | 3 parts |
| Calcium stearate | 1 parts |
| Lucophore CE liquid[7] | 3.5 parts |
| Thickener[8] | 0.4 parts |
| Dispex N-40 dispersing aid[9] | 1 parts |
| Drewplus L474 defoamer | 0.2 parts |

[1]Alcoa Industrial Chemicals, Bauxite, Arizona
[2]IMERYS, Sandersville, Georgia
[3]Rhom Haas Chemical Company, Charlotte, North Carolina
[4]National Starch Chemical Company, Bridgewater, New Jersey
[5]Sodium salt of sulfonated polystyrene, from National Starch Company, Bridgewater, New Jersey
[6]Penford Products, Cedar Rapids, Iowa
[7]Optical brightening agent, from Clariant, Charlotte, North Carolina
[8]Rhom Haas Chemical Company, Charlotte, North Carolina
[9]Ciba Specialty Chemicals Corporation, High Point, North Carolina
[10]Ashland Chemical Company, Dublin, Ohio The coating composition was applied on both sides of a 24# paper with a blade coater with a coating weight of about 5 lb per side. Each side had a single coating layer having a thickness of between 8-20 gsm. The coated roll was super-calendered at the following conditions: Temperature: 90 C; Pressure: 1,000 PSI; Speed: 200 fpm; Number of Nips: 12.

The physical properties of the coated paper are listed in Table Ib.

TABLE Ib

| Basis weight, gsm | 125 |
|---|---|
| Caliper, mil | 4.3 |
| GE brightness, % | 97 |
| 75 degree gloss, % | 72 |
| Air resistance, s/100 cc | 5,621 |
| Formation index, Kajaani | 116 |
| Opacity | 94 |

TABLE Ib-continued

| Surface Resistivity, ohms/square | $1.4 \times 10^{11}$ |
|---|---|
| Parker Roughness, 10 kgf/cm2 | 1.2 |

Example 2

A coating composition was prepared according to the formulation in Table IIa.

TABLE IIa

| Hydral Coat 2 Aluminum trihydrate[1] | 79.4 parts |
|---|---|
| Capim DG pigment[2] | 13.2 parts |
| Ropaque HP-1055[3] | 7.4 parts |
| Vinyl Acetate Acrylic Copolymer[4] | 19.5 parts |
| Anion type modified polystyrene[5] | 1.8 parts |
| Ethylated Starch[6] | 2.9 parts |
| Calcium stearate | 1 parts |
| Lucophore CE liquid[7] | 3.5 parts |
| Thickener[8] | 0.6 parts |
| Dispex N-40 dispersing aid[9] | 1 parts |
| Drewplus L474 defoamer[10] | 0.2 parts |

[1]Alcoa Industrial Chemicals, Bauxite, Arizona
[2]IMERYS, Sandersville, Georgia
[3]Rhom Haas Chemical Company, Charlotte, North Carolina
[4]National Starch Chemical Company
[5]Sanyo Chemical Industries, Kyoto, Japan
[6]Penford Products, Cedar Rapids, Iowa
[7]Optical brightening agent, from Clariant, Charlotte, North Carolina
[8]Rhom Haas Chemical Company, Charlotte, North Carolina
[9]Ciba Specialty Chemicals Corporation, High Point, North Carolina
[10]Ashland Chemical Company, Dublin, Ohio The coating composition was applied on both sides of a 24# paper with a blade coater with a coating weight of about 5 lb per side. Each side had a single coating layer. The coated roll was calendered on a lab calender machine using following conditions: Temperature: 90 C; Pressure: 1,000 PSI; Speed: 9 fpm; Number of Nips: 4.

The physical properties of the coated paper are listed in Table IIIb.

TABLE IIb

| GE brightness | 97 |
|---|---|
| 75 degree gloss | 76 |
| Air resistance, s/100 cc, | 2,002 |
| Surface Resistivity, ohms/square | $4 \times 10^{11}$ |
| CIE L* | 96 |
| CIE a* | −0.2 |
| CIE b* | −3.5 |

The gloss coated sheets were evaluated on HP 4550 color laser printer, HP 8550 color laser printer and Xerox Phaser 740 color laser printer, Xerox Phaser 560 color laser printer, and Xerox DocuColor 12 color copier, and Canon CLC 500 color copier. No coating blistering was observed. Excellent image quality was obtained.

Example 3

A coating composition was prepared according to the formulation in Table IIIa for use as a top coat.

TABLE IIIa

| Hydral Coat 2 Aluminum trihydrate[1] | 79.4 parts |
|---|---|
| Capim DG pigment[2] | 13.2 parts |
| Ropaque HP-1055[3] | 7.4 parts |

TABLE IIIa-continued

| | |
|---|---|
| Vinyl Acetate Acrylic Copolymer[4] | 19.5 parts |
| Polyethylene glycol 4000[5] | 1.7 parts |
| Ethylated Starch[6] | 2.9 parts |
| Calcium stearate | 1 parts |
| Lucophore CE liquid[7] | 3.5 parts |
| Thickener[8] | 0.6 parts |
| Dispex N-40 dispersing aid[9] | 1 parts |
| Drewplus L474 defoamer[10] | 0.2 parts |

[1] Alcoa Industrial Chemicals, Bauxite, Arizona
[2] IMERYS, Sandersville, Georgia
[3] Rhom Haas Chemical Company, Charlotte, North Carolina
[4] National Starch Chemical Company, Bridgewater, New Jersey
[5] Sanyo Chemical Industries, Kyoto, Japan
[6] Penford Products, Cedar Rapids, Iowa
[7] Optical brightening agent, from Clariant, Charlotte, North Carolina
[8] Rhom Haas Chemical Company, Charlotte, North Carolina
[9] Ciba Specialty Chemicals Corporation, High Point, North Carolina
[10] Ashland Chemical Company, Dublin, Ohio The coating composition was applied on both sides of a 24# paper with a blade coater with a coating weight of about 5 lb per side. Each side had a single coating layer. The coated roll was calendered on a lab calender machine using following conditions: Temperature: 90 C; Pressure: 1,000 PSI; Speed: 9 fpm; Number of Nips: 4.

The physical properties of the coated paper are listed in Table IIIb.

TABLE IIIb

| | |
|---|---|
| GE brightness | 96.4 |
| 75 degree gloss | 74 |
| Air resistance, s/100 cc | 1,620 |
| Surface Resistivity, ohms/square | $2 \times 10^{11}$ |
| CIE L* | 95.4 |
| CIE a* | −0.03 |
| CIE b* | −3.86 |

The gloss coated sheets were evaluated on HP 4550 color laser printer, HP 8550 color laser printer and Xerox Phaser 740 color laser printer, Xerox Phaser 560 color laser printer, and Xerox DocuColor 12 color copier. No coating blistering was observed. Excellent image quality was obtained.

Example 4

A coating composition was prepared according to the formulation in Table IV to be used as pre-coat or base coat that is applied prior to the application of a top coating of the composition according to the invention.

TABLE IV

| | |
|---|---|
| Carbopaque 95[1] | 75 parts |
| Alphatex[2] | 25 parts |
| Ethylated Starch[6] | 17 parts |
| Lucophore CE liquid[7] | 1.3 parts |
| Thickener[8] | 0.5 parts |
| Drewplus L474 defoamer[10] | 0.2 parts |

[1] IMERYS, Sandersville, Georgia
[2] IMERYS, Sandersville, Georgia
[3] Penford Products, Cedar Rapids, Iowa
[4] Optical brightening agent, from Clariant, Charlotte, North Carolina
[5] Rhom Haas Chemical Company, Charlotte, North Carolina
[6] Ashland Chemical Company, Dublin, Ohio The base coat composition was applied on both sides of a 24# paper with a pilot blade coater with a coating weight of about 6 gsm per side.

Example 5

A coating composition was prepared according to the formulation in Table Va.

TABLE Va

| | |
|---|---|
| Carbopaque 95[1] | 75 parts |
| Capim DG pigment[2] | 20 parts |
| Ropaque HP-1055[3] | 5 parts |
| Styrene Acrylate Latex[4] | 19 parts |
| Sodium salt of sulfonated polystyrene[5] | 1.5 parts |
| Ethylated Starch[6] | 2.9 parts |
| Calcium stearate | 1 parts |
| Lucophore CE liquid[7] | 3.5 parts |
| Thickener[8] | 0.4 parts |
| Dispex N-40 dispersing aid[9] | 1 parts |
| Drewplus L474 defoamer[10] | 0.2 parts |

[1] IMERYS, Sandersville, Georgia
[2] IMERYS, Sandersville, Georgia
[3] Rhom Haas Chemical Company, Charlotte, North Carolina
[4] BASF, Charlotte, North Carolina
[5] National Starch Chemical Company, Bridgewater, New Jersey
[6] Penford Products, Cedar Rapids, Iowa
[7] Optical brightening agent, from Clariant
[8] Rhom Haas Chemical Company, Charlotte, North Carolina
[9] Ciba Specialty Chemicals Corporation, High Point, North Carolina
[10] Ashland Chemical Company, Dublin, Ohio The coating composition was applied on both sides of the pre-coated base stock (Example 4) using a pilot blade coater with a coating weight of about 10 gsm per side. The coated roll was then super-calendered using following conditions: Temperature: 100 C; Pressure: 185 KN/M; Speed: 600 mpm; Number of Nips: 10.

The physical properties of the coated sheet are listed in Table Vb.

TABLE Vb

| | |
|---|---|
| GE brightness, % | 92.8 |
| 75 degree gloss, % | 70 |
| Air Resistance, s/100 cc | 8,910 |
| Surface Resistivity, ohms/square | $1.3 \times 10^{11}$ |
| CIE L* | 96 |
| CIE a* | −0.3 |
| CIE b* | −1.3 |

The gloss coated sheets were evaluated on HP 4550 color laser printer, HP 8550 color laser printer and Xerox Phaser 740 color laser printer, Xerox Phaser 560 color laser printer, and Xerox DocuColor 12 color copier. No coating blistering was observed. Excellent image quality was obtained.

Example 6

A coating composition was prepared according to the formulation in Table VIa

TABLE VIa

| | |
|---|---|
| Opti-Cal Print[1] | 68 parts |
| Capim DG pigment[2] | 25 parts |
| Ropaque HP-1055[3] | 7 parts |
| Vinyl Acetate Acrylic Copolymer[4] | 10 parts |
| Sodium salt of sulfonated polystyrene[5] | 1.2 parts |
| Ethylated Starch[6] | 3.0 parts |
| Calcium stearate | 1 parts |

TABLE VIa-continued

| | |
|---|---|
| Lucophore CE liquid[7] | 3.5 parts |
| Thickener[8] | 0.4 parts |
| Dispex N-40 dispersing aid[9] | 1 parts |
| Drewplus L474 defoamer[10] | 0.2 parts |

[1]IMERYS, Sandersville, Georgia
[2]IMERYS, Sandersville, Georgia
[3]Rhom Haas Chemical Company, Charlotte, North Carolina
[4]National Starch Chemical Company, Bridgewater, New Jersey
[5]National Starch Chemical Company, Bridgewater, New Jersey
[6]Penford Products, Cedar Rapids, Iowa
[7]Optical brightening agent, from Clariant
[8]Rhom Haas Chemical Company, Charlotte, North Carolina
[9]Ciba Specialty Chemicals Corporation, High Point, North Carolina
[10]Ashland Chemical Company, Dublin, Ohio The coating composition was applied on one surface of a 28# base stock using a pilot blade coater with a coating weight of about 10 gsm per side. The coated roll was then calendered using a cotton-to-steel lab calender under the following conditions: Temperature: 150 F; Pressure: 1,500 PSI; Speed: 9 fpm; Number of Nips: 4.

The physical properties of the coated paper are listed in Table VIb.

TABLE VIb

| | |
|---|---|
| GE brightness, % | 95 |
| 75 degree gloss, % | 75 |
| Air Resistance, s/100 cc | 2,033 |
| Surface Resistivity, ohms/square | $3.3 \times 10^{11}$ |
| CIE L* | 96.8 |
| CIE a* | 1.65 |
| CIE b* | −7.5 |

The gloss coated sheets were evaluated on HP 4550 color laser printer, HP 8550 color laser printer and Xerox Phaser 740 color laser printer, Xerox Phaser 560 color laser printer, and Xerox DocuColor 12 color copier. No coating blistering was observed. Excellent image quality was obtained.

Example 7

A coating composition was prepared according to the formulation in Table VIIa.

TABLE VIIa

| | |
|---|---|
| Opti-Cal Print[1] | 68 parts |
| Capim DG pigment[2] | 25 parts |
| Ropaque HP-1055[3] | 7 parts |
| Carboxylated styrene/butadiene polymer[4] | 10 parts |
| Sodium salt of sulfonated polystyrene[5] | 1.2 parts |
| Ethylated Starch[6] | 3.0 parts |
| Calcium stearate | 1 parts |
| Lucophore CE liquid[7] | 3.5 parts |
| Thickener[8] | 0.4 parts |
| Dispex N-40 dispersing aid[9] | 1 parts |
| Drewplus L474 defoamer[10] | 0.2 parts |

[1]IMERYS, Sandersville, Georgia
[2]IMERYS, Sandersville, Georgia
[3]Rhom Haas Chemical Company, Charlotte, North Carolina
[4]Dow Chemical Company, Midland, Michigan
[5]National Starch Chemical Company, Bridgewater, New Jersey
[6]Penford Products, Cedar Rapids, Iowa
[7]Optical brightening agent, from Clariant, Charlotte, North Carolina
[8]Rhom Haas Chemical Company, Charlotte, North Carolina
[9]Ciba Specialty Chemicals Corporation, High Point, North Carolina
[10]Ashland Chemical Company, Dublin, Ohio The coating composition was applied on both sides of a 28# base stock using a pilot blade coater with a coating weight of about 10 gsm per side. The coated roll was then calendered using a cotton-to-steel lab calender under the following conditions: Temperature: 150 F; Pressure: 1,500 PSI; Speed: 9 fpm; Number of Nips: 4.

The physical properties of the coated paper are listed in Table VIIb.

TABLE VIIb

| | |
|---|---|
| GE brightness, % | 95.4 |
| 75 degree gloss, % | 79 |
| Air Resistance, s/100 cc | 3,070 |
| Surface Resistivity, ohms/square | $1.4 \times 10^{11}$ |
| CIE L* | 96.9 |
| CIE a* | 1.6 |
| CIE b* | −7.3 |

The gloss coated sheets were evaluated on HP 4550 color laser printer, HP 8550 color laser printer and Xerox Phaser 740 color laser printer, Xerox Phaser 560 color laser printer, and Xerox DocuColor 12 color copier. No coating blistering was observed. Excellent image quality was obtained.

Example 8

A coating composition was prepared according to the formulation in Table VIIIa.

TABLE VIIIa

| | |
|---|---|
| Opti-Cal Print[1] | 68 parts |
| Capim DG pigment[2] | 25 parts |
| Ropaque HP-1055[3] | 7 parts |
| Styrene Acrylate Latex[4] | 10 parts |
| Sodium salt of sulfonated polystyrene[5] | 1.2 parts |
| Ethylated Starch[6] | 3.0 parts |
| Calcium stearate | 1 parts |
| Lucophore CE liquid[7] | 3.5 parts |
| Thickener[8] | 0.4 parts |
| Dispex N-40 dispersing aid[9] | 1 parts |
| Drewplus L474 defoamer[10] | 0.2 parts |

[1]IMERYS, Sandersville, Georgia
[2]IMERYS, Sandersville, Georgia
[3]Rhom Haas Chemical Company, Charlotte, North Carolina
[4]BASF, Charlotte, North Carolina
[5]National Starch Chemical Company, Bridgewater, New Jersey
[6]Penford Products, Cedar Rapids, Iowa
[7]Optical brightening agent, from Clariant, Charlotte, North Carolina
[8]Rhom Haas Chemical Company, Charlotte, North Carolina
[9]Ciba Specialty Chemicals Corporation, High Point, North Carolina
[10]Ashland Chemical Company, Dublin, Ohio The coating composition was applied on both sides of a 28# base stock using a pilot blade coater with a coating weight of about 10 gsm per side. The coated roll was then calendered using a cotton-to-steel lab calender under the following conditions: Temperature: 150 F; Pressure: 1,500 PSI; Speed: 9 fpm; Number of Nips: 4.

The physical properties of the coated sheet are listed in Table VIIb.

TABLE VIIIb

| | |
|---|---|
| GE brightness, % | 95.3 |
| 75 degree gloss, % | 80 |
| Air Resistance, s/100 cc | 2,081 |
| Surface Resistivity, ohms/square | $2.9 \times 10^{11}$ |
| CIE L* | 96.9 |
| CIE a* | 1.44 |
| CIE b* | −7.1 |

The gloss coated sheets were evaluated on HP 4550 color laser printer, HP 8550 color laser printer and Xerox Phaser 740 color laser printer, Xerox Phaser 560 color laser printer, and Xerox DocuColor 12 color copier. No coating blistering was observed. Excellent image quality was obtained.

Finally, variations from the examples given here are possible in view of the above-disclosure. Therefore, although the invention has been described with reference to certain preferred embodiments, it will be appreciated that other compositions may be devised, which are nevertheless within the scope and spirit of the invention as defined in the claims appended hereto.

The invention now being fully described, it will be apparent to one of ordinary skill in the art that many changes and modifications can be made thereto without departing from the spirit or scope of the invention as set forth herein.

What is claimed is:

1. A coating composition comprising:
   a inorganic pigment component; and a binder component; wherein said binder component a mixture of about 60 to about 95% by weight of a first film forming binder resin and a from about 5 to about 40% by total weight of a second film forming binder resin wherein said weight percents are based on the total weight of the binder component and wherein said binder component comprises from about 8% to about 25% by weight and the pigment component comprises from about 50 to 90% by weight, each weight percent based on the total dry weight of the solids in the coating composition.

2. The coating composition according to claim 1, wherein said binder component are binder resins selected from the group consisting of vinyl acetate acrylate copolymers, styrene acrylate latexes, styrene butadiene acrylate copolymers, polyvinyl acetate, styrene butadiene, acrylonitrile copolymer, styronal, anion type polystyrene derivatives, polyethylene glycol and polypropylene glycol.

3. The coating composition according to claim 1, wherein said first binder resin is selected from the group consisting of vinyl acetate, styrene acrylate and styrene butadiene acrylate copolymers and the second binder resin is selected from the group consisting of anion polystyrene derivatives, polyethylene glycol and polypropylene glycol.

4. The coating composition according to claim 3, wherein said first binder resin provides coating gloss and adhesion properties and said second binder resin provides porosity, adhesion and anti-static properties.

5. The coating composition according to claim 1, wherein said pigment component is present between 50-90% by dry weight and said binder component is present between 8-25% by dry weight.

6. The coating composition according to claim 1, wherein said pigment component comprises a pigment selected from the group consisting of aluminium trihydrate powder, kaolin clay, calcium carbonate, satin white, silica, alumina silicates and plastic pigments.

7. The coating composition according to claim 6, wherein said pigment particle size is in the range of 0.05 to 5 microns.

8. A coated product comprising a substrate and a pigmented coating composition coated on at least one surface of the substrate; wherein said pigmented coating composition comprises a pigment component; and a binder component; wherein said binder component comprises a mixture from about 60 to about 95% by weight of a first film forming binder resin and from about 5 to about 40% by weight of a second film forming binder resin wherein said weight percents are based on the total weight of the binder component and wherein said binder component comprises from about 8% to about 25% by total dry weight of the solids in the coating composition.

9. The coated product according to claim 8, wherein said binder component are binder resins selected from the group consisting of vinyl acetate acrylate copolymers, styrene acrylate latexes, styrene butadiene acrylate copolymers, polyvinyl acetate, styrene butadiene, acrylonitrile copolymer, styronal, anion type polystyrene derivatives, polyethylene glycol and polypropylene glycol.

10. The coated product according to claim 8, wherein said first binder resin is selected from the group consisting of vinyl acetate, styrene acrylate and styrene butadiene acrylate copolymers and said second binder resin is selected from the group consisting of anion polystyrene derivatives, polyethylene glycol and polypropylene glycol.

11. The coated product according to claim 10, wherein said first binder resin is present between 60-95% by weight of the total binder resin mixture and said second binder resin is present between 5-40% by weight of the total binder resin mixture.

12. The coated product according to claim 10, wherein said first binder resin provides coating gloss and adhesion properties and said second binder resin provides porosity, adhesion and anti-static properties.

13. The coated product according to claim 8, wherein said pigment component comprises a pigment selected from the group consisting of aluminium trihydrate powder, kaolin clay, calcium carbonate, satin white, silica, alumina silicates and plastic pigments.

14. The coated product according to claim 13, wherein said pigment particle size is in the range of 0.05 to 5 microns.

15. The coated product according to claim 8, wherein said pigmented coating composition is on both sides of said substrate.

16. The coated product according to claim 8, wherein at least one side of said substrate is first coated with a base coat and said pigmented coating composition is a top coat over said base coat.

17. The coated product according to claim 16, wherein said base coat comprises a pigment component and starch.

18. The coated product according to claim 16, wherein said base coat is the same composition as said top coat.

19. The coated product according to claim 16, wherein said base coat and said top coat have a coating weight between 8 to 20 g/m$^2$.

20. The coated product according to claim 16, further comprising a base coat over both sides of said substrate.

21. The coated product according to claim 20, further comprising said pigmented coating composition over both sides of said base coat.

22. The coated product according to claim 8, wherein said substrate is paper.

23. The coated product according to claim 8, wherein the amount of the binder component in the coating is from about 10 to about 22% by weight of the coating.

* * * * *